US008087403B2

(12) United States Patent
Asanuma et al.

(10) Patent No.: US 8,087,403 B2
(45) Date of Patent: Jan. 3, 2012

(54) HEATING APPARATUS OF ELECTROMAGNETIC PCV VALVE

(75) Inventors: Hiroshi Asanuma, Chita (JP); Katsumi Ishida, Toyoake (JP); Koichi Suzuki, Obu (JP); Naoya Okada, Kasugai (JP); Shoichiro Morinaka, Toyota (JP)

(73) Assignees: Aisan Kogyo Kabushiki Kaisha, Obu-Shi (JP); Toyota Jidosha Kabushiki Kaisha, Toyota (JP)

( * ) Notice: Subject to any disclaimer, the term of this patent is extended or adjusted under 35 U.S.C. 154(b) by 452 days.

(21) Appl. No.: 12/379,802

(22) Filed: Mar. 2, 2009

(65) Prior Publication Data

US 2009/0229584 A1    Sep. 17, 2009

(30) Foreign Application Priority Data

Mar. 14, 2008  (JP) .................................. 2008-065211

(51) Int. Cl.
 *F01M 13/00* (2006.01)
(52) U.S. Cl. ........................................ 123/574
(58) Field of Classification Search .......... 123/572–574, 123/41.86
 See application file for complete search history.

(56) References Cited

U.S. PATENT DOCUMENTS

| | | | | |
|---|---|---|---|---|
| 3,198,208 A | * | 8/1965 | Tramontini | 137/480 |
| 3,581,721 A | * | 6/1971 | Horiuchi | 123/574 |
| 3,766,898 A | * | 10/1973 | McMullen | 123/574 |
| 4,056,085 A | * | 11/1977 | Nowroski et al. | 123/574 |
| 4,625,703 A | * | 12/1986 | Otto et al. | 123/574 |
| 4,686,952 A | * | 8/1987 | Zeigler et al. | 123/572 |
| 6,546,921 B1 | * | 4/2003 | Callahan | 123/573 |
| 2004/0231651 A1 | * | 11/2004 | Wade et al. | 123/573 |
| 2006/0236989 A1 | * | 10/2006 | Callahan | 123/574 |
| 2008/0099000 A1 | * | 5/2008 | Suzuki et al. | 123/574 |

FOREIGN PATENT DOCUMENTS

| | | |
|---|---|---|
| JP | A-53-118640 | 10/1978 |
| JP | A-59-34081 | 2/1984 |
| JP | U-60-98709 | 7/1985 |
| JP | U-61-122313 | 8/1986 |
| JP | A-7-83091 | 3/1995 |
| JP | A-08-338222 | 12/1996 |
| JP | A-10-77821 | 3/1998 |
| JP | A-2000-146001 | 5/2000 |
| JP | A-2005-188605 | 7/2005 |

OTHER PUBLICATIONS

Japanese Office Action issued in Japanese Patent Application No. 2008-065211, mailed on Jan. 12, 2010.

* cited by examiner

*Primary Examiner* — M. McMahon
(74) *Attorney, Agent, or Firm* — Oliff & Berridge, PLC (57) ABSTRACT

An electromagnetic PCV valve includes a valve seat, a valve element, a step motor for moving the valve element, and a housing that houses the valve seat, the valve element, and the step motor. When the valve element is moved by the step motor, a size (an opening degree) of a blow-by gas passage defined between the valve seat and the valve element is changed. The step motor is configured to selectively receive energization for moving the valve element and energization for holding the valve element in a fixed position. A heating apparatus of the PCV valve 1 includes a cover member and an output shaft that conducts heat generated in the step motor by energization to the valve element and the valve seat, and an electronic control unit (ECU) for conducting energization of the step motor to hold the valve element in the fixed position.

20 Claims, 5 Drawing Sheets

HEATING APPARATUS OF ELECTROMAGNETIC PCV VALVE

CROSS-REFERENCE TO RELATED APPLICATIONS

This application is based upon and claims the benefit of priority from the prior Japanese Patent Application No. 2008-65211 filed on Mar. 14, 2008, the entire contents of which are incorporated herein by reference.

TECHNICAL FIELD

The present invention relates to an electromagnetic PCV valve (positive crankcase ventilation valve) placed in a blow-by gas returning device and adapted to move a valve element by an electromagnetic device and more particularly to a heating apparatus for heating the electromagnetic PCV valve.

BACKGROUND ART

Heretofore, for example, JP8(1996)-338222A and JP53(1978)-118640A disclose an electromagnetic PCV valve arranged to control an open/closed position of a valve element according to an operating state of an engine. In JP8(1996)-338222A, a columnar valve element having a conical leading end is placed to be changeable in a position in an axial direction to change a flow sectional area of a blow-by gas passage according to the position of the valve element with respect to the valve seat. A rear end of this valve element is connected to a shaft whose end is attached with a columnar plunger made of ferromagnetism metal. Around this plunger, a coil is arranged at a distance therefrom. When this coil is energized under control of a controller according to an operating state of an engine, the plunger is moved by an electromagnetic force of the coil to move the valve element in the axial direction, thereby changing the blow-by gas flow sectional area between the valve element and the valve seat. JP53(1978)-118640A also discloses a PCV valve similar to the electromagnetic PCV valve of JP8(1996)-338222A.

Furthermore, JP61(1986)-122313U and JP60(1985)-98709U disclose a PCV valve provided with a valve case internally including a valve chamber and an electric heater serving as a special heating means disposed on the outer periphery of the valve case. This electric heater can heat the valve element and the valve seat placed in the valve chamber.

SUMMARY OF INVENTION

Technical Problem

However, in the electromagnetic PCV valves in JP8(1996)-338222A and JP53(1978)-118640A, water or moisture contained in the blow-by gas may freeze in the blow-by gas passage. Particularly, a metering zone between the valve element and the valve seat has such a narrow flow sectional area in which the valve element may stick to the valve seat when the valve element freezes up. Furthermore, even during engine operation, the temperature of outside air sometimes lowers and hence the valve element may freeze up and stick to the valve seat when the valve element is stopped. To avoid such defects, it is conceivable to combine the electromagnetic PCV valves in JP8(1996)-338222A and JP53(1978)-118640A with the special electric heater in JP61(1986)-122313U and JP60(1985)-98709U. In this case, the freezing may be eliminated by energizing the electric heater to generate heat. However, the valve configuration and electric wiring would be complicated due to the addition of the electric heater.

The present invention has been made in view of the above circumstances and has an object to provide a heating apparatus of an electromagnetic PCV valve, capable of efficiently preventing freezing between a valve seat and a valve element without adding a special heating means such as an electric heater.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

Solution to Problem

To achieve the purpose of the invention, there is provided a heating apparatus of electromagnetic PCV valve, comprising: a valve seat; a valve element placed to be movable with respect to the valve seat; an electromagnetic device for moving the valve element; a housing that houses the valve seat, the valve element, and the electromagnetic device, wherein the electromagnetic device is operated by energization to move the valve element with respect to the valve seat, thereby changing a size of a blow-by gas passage defined between the valve seat and the valve element; wherein the heating apparatus of electromagnetic PCV valve further comprises: a heat conduction device for conducting heat generated in the electromagnetic device by energization to at least one of the valve element and the valve seat, the electromagnetic device being configured to selectively receive energization for moving the valve element and energization for holding the valve element in a fixed position; and an energization control device for energizing the electromagnetic device to hold the valve element in the fixed position.

BRIEF DESCRIPTION OF DRAWINGS

The accompanying drawings, which are incorporated in and constitute a part of this specification illustrate an embodiment of the invention and, together with the description, serve to explain the objects, advantages and principles of the invention.

In the drawings.

DESCRIPTION OF EMBODIMENTS

First Embodiment

A detailed description of a first preferred embodiment of a heating apparatus of an electromagnetic PCV valve embodying the present invention will now be given referring to the accompanying drawings.

Figure 1:
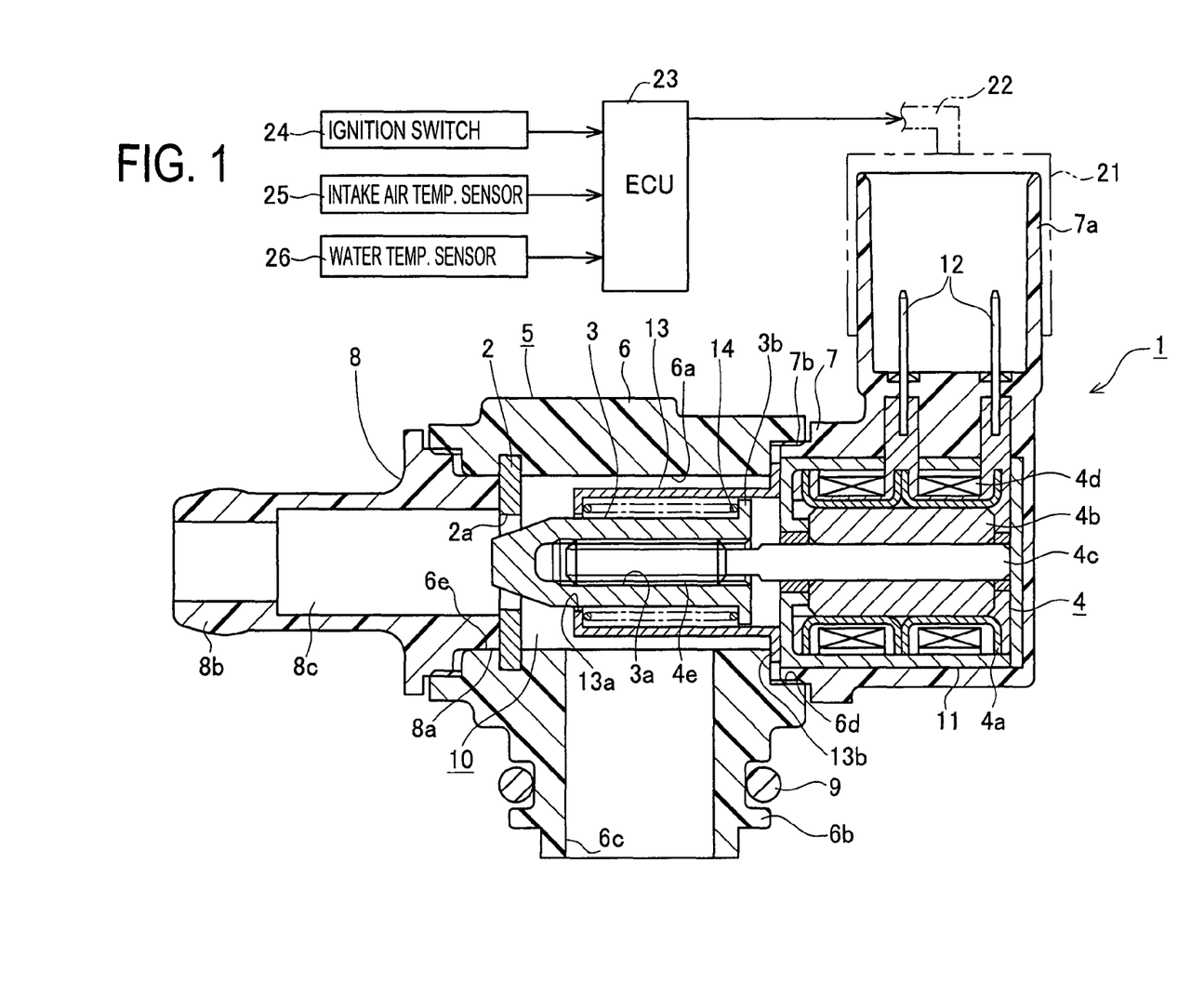
FIG. 1 is sectional view with a block diagram, showing an electromagnetic PCV valve and a heating apparatus thereof in a first embodiment.

FIG. 1 is a sectional view with a block diagram, showing an electromagnetic PCV valve 1 and a heating apparatus thereof in this embodiment. As is generally known, this PCV valve 1 is mounted in an engine and serves as a component of a blow-by gas returning device arranged to cause blow-by gas leaking from a combustion chamber of the engine to a crank case to flow to an intake passage of the engine again so as to return to the combustion chamber. As schematically shown in FIG. 1, the PCV valve 1 includes a valve seat 2, a valve element 3 placed to be movable with respect to the valve seat 2, a step motor 4 for moving the valve element 3, and a housing 5 that houses the valve seat 2, the valve element 3, and the step motor 4. When the step motor 4 is actuated by energization to move the valve element 3 with respect to the valve seat 2, the size (a sectional area) of a blow-by gas passage between the valve seat 2 and the valve element 3, namely, an "opening degree" is changed to control a flow rate of blow-by gas to be metered by the PCV valve 1. This PCV valve 1 includes the step motor 4 to move the valve element 3, but does not additionally include any special heating means such as an electric heater for preventing freezing between the valve seat 2 and the valve element 3 or eliminating the freezing. The details of a configuration of the PCV valve 1 and the heating apparatus thereof will be explained below.

In this embodiment, the housing 5 has a hollow shape and includes three separate parts, namely, a first housing 6, a second housing 7, and a third housing 8. These first to third housings 6 to 8 are individually made of resin by molding. The first housing 6 includes a hollow part 6a formed therein and an inlet-side pipe joint 6b formed under the hollow part 6a. The inlet-side pipe joint 6b includes an inlet passage 6c communicated with the hollow part 6a. A seal ring 9 is fitted on the outer periphery of the pipe joint 6b. The hollow part 6a provides a valve chamber 10 in which the valve element 3 is placed and the valve seat 2 is attached on an outlet side of the valve chamber 10. The second housing 7 contains the step motor 4 integrally molded therein and includes a connector 7a on an upper side. Specifically, the step motor 4 is insert-molded in the second housing 7. The step motor 4 is covered by a motor case 11 and integrally molded in the second housing 7. The second housing 7 has a leading-end periphery 7b that is press-fitted in a rear-end opening 6d of the first housing 6 and assembled to the first housing 6 by ultrasonic welding. The third housing 8 has a rear-end periphery 8a that is press-fitted in a leading-end opening 6e of the first housing 6 and assembled to the first housing 6 by ultrasonic welding. A leading end of the third housing 8 is formed as an outlet-side pipe joint 8b. The third housing 8 internally includes a hollow part 8c. The inlet-side pipe joint 6b of the first housing 6 is attached to a mounting hole of an engine main body or the like. The outlet-side pipe joint 8b of the third housing 8 is connected to one end of a blow-by gas returning passage (pipe) communicated with an intake passage of an engine. In this embodiment, the inlet passage 6c and the valve chamber 10 of the first housing 6 and the hollow part 8c of the third housing 8 constitute a blow-by gas passage through which blow-by gas can flow.

The step motor 4 includes a stator 4a defining an outer periphery, a rotor 4b placed inside the stator 4a, and an output shaft 4c placed in the center of the rotor 4b. The stator 4a includes coils 4d and is provided with external terminals 12. The external terminals 12 are arranged with respective distal ends protruding into the connector 7a. The outer periphery of the stator 4a is in contact with an inner wall of the motor case 11. In the valve element 3, the output shaft 4c protruding from the step motor 4 is inserted. Specifically, a screw 4e formed on the outer periphery of the output shaft 4c is threadedly engaged in a screw hole 3a formed in the valve element 3, thereby drivingly connecting the valve element 3 and the output shaft 4c. When the output shaft 4c in this state is rotated, the valve element 3 is moved in its axial direction by the threaded engagement relationship between the screw 4e and the screw hole 3a. The moving direction of the valve element 3 is determined based on a rotation direction (normal rotation/reverse rotation) of the output shaft 4c. In this embodiment, the step motor 4 is configured to selectively receive energization for moving the valve element 3 and energization for holding the valve element 3 in a fixed position. In other words, when receives energization, the step motor 4 can rotate the output shaft 4c or hold it against rotation.

The valve element 3 has a nearly cylindrical shape having a truncated conical leading end. The valve seat 2 has an annular shape including a valve hole 2a in the center. The leading end of the valve element 3 is formed to pass through the valve hole 2a of the valve seat 2. In this embodiment, the output shaft 4c of the step motor 4 and the valve element 3 are made of metal such as aluminum. Accordingly, the step motor 4 and the valve element 3 are thermally connected to each other through the output shaft 4c that has higher heat conductivity than the housing 5.

In this embodiment, in the valve chamber 10, a cover member 13 is placed to enclose the valve element 3. The cover member 13 has a nearly cylindrical shape including a hole 13a formed in a leading end and a flange 13b formed at a rear end. The hole 13a is configured to allow the valve element 3 to pass therethrough. The cover member 13 is made of metal, such as aluminum, having higher heat conductivity than the housing 5. The cover member 13 is placed with the flange 13b contacting an end face of the motor case 11 of the step motor 4. This flange 13b is fixedly sandwiched between the end face of the motor case 11 and the inner wall of the first housing 6. In this embodiment, a flange 3b is formed at a rear end of the valve element 3. In the cover member 13, furthermore, a compression spring 14 is mounted between the inner wall of the leading end of the cover member 13 and the flange 3b. The valve element 3 is thus urged by the spring 14 to separate from the valve seat 2.

The connector 7a of the second housing 7 is connected to an external connector 21. This external connector 21 is electrically connected to the external terminals 12. The external connector 21 is also connected to an electronic control unit (ECU) 23 through an external wiring 22 in order to control the step motor 4 of the PCV valve 1. The ECU 23 is connected to an ignition switch 24 to be operated at the time of engine start, an intake air temperature sensor 25 for detecting a temperature of intake air (THA) in an intake passage as an outside-air temperature, and a water temperature sensor 26 for detecting a temperature of cooling water (THW) in the engine. The ECU 23 stores an energization control program to control energization of the step motor 4 of the PCV valve 1. Upon receipt of a signal from each of the sensors 24 to 26, the ECU 23 is operated to control the energization of the step motor 4 based on the above energization control program.

Figure 2:
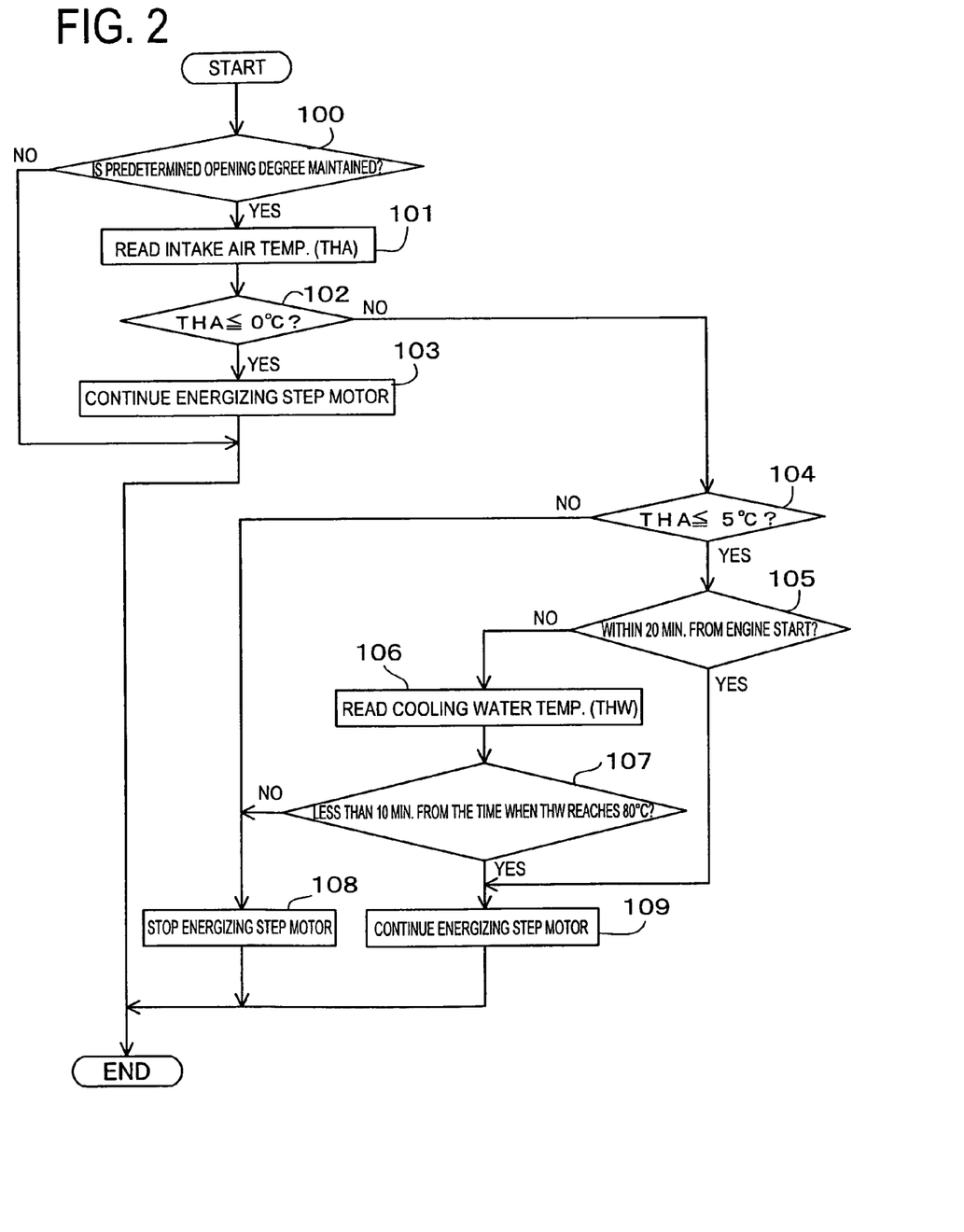
FIG. 2 is a flowchart showing an energization control program in the first embodiment.

FIG. 2 is a flowchart of the energization control program to be executed by the ECU 23. The ECU 23 periodically executes a routine in this flowchart at predetermined time intervals.

When the ignition switch 24 is operated at the time of engine start or when the engine is operating after the engine start, the ECU 23 first determines in step 100 whether or not the PCV valve 1 has to be maintained at a predetermined opening degree, that is, whether or not the valve element 3 has to be held in a fixed position. Herein, in the case where the valve element 3 has only to be held at the predetermined opening degree because the opening degree of the PCV valve 1 does not have to be changed at the engine start or during the engine operation following the engine start, the ECU 23 advances the processing from step 100 to step 101. On the other hand, in the case where the opening degree of the PCV valve 1 has to be changed during the engine operation following the engine start, the ECU 23 temporarily terminates the subsequent processing. In this case, the ECU 23 energizes the step motor 4 to move the valve element 3 of the PCV valve 1 according to another processing.

In step 101, the ECU 23 reads the intake air temperature THA detected by the intake air temperature 25. In step 102, the ECU 23 successively determines whether the intake air temperature THA is "0° C. or less". This determination is made by assuming that, if the intake air temperature THA is "0° C. or less", blow-by gas flowing in the valve chamber 10 of the PCV valve 1 is likely to be cooled by outside air and freeze up between the valve seat 2 and the valve element 3. If this determination result is affirmative, judging that it is a cold condition and the PCV valve 1 is highly likely to freeze up, the ECU 23 energizes the step motor 4 of the PCV valve 1 and continues energizing the step motor 4 and temporarily terminates subsequent processing. This energization is performed to hold the valve element 3 of the PCV valve 1 in the fixed position. Accordingly, while the energization is continued, the step motor 4 generates heat.

If the determination result in step 102 is negative, judging that it is not a cold condition, the ECU 23 goes to step 104 to determine whether the intake air temperature THA is "5° C. or less". If this determination result in step 104 is negative, judging that the PCV valve 1 is less likely to freeze up, the ECU 23 stops energizing the step motor 4 in step 108 and temporarily terminates subsequent processing.

If the determination result in step 104 is affirmative, judging that the PCV valve 1 is likely to freeze up, the ECU 23 determines in step 105 whether or not it is within 20 min. from the engine start. Herein, when the intake air temperature THA is "5° C. or less" even through it exceeds "0° C.", the intake air temperature may become blow zero according to atmospheric temperature changes in a day. In the case where the engine is stopped and soaked (let stand) overnight, water or moisture sticking to the valve element could conceivably freeze. When the intake air temperature THA is "5° C. or less" even after the engine start, ice sometimes remains unmelted for a while. The determination in step 105 is executed by assuming such condition. If this determination result is affirmative, judging that the PCV valve 1 may freeze up, the ECU 23 energizes the step motor 4 of the PCV valve 1 and continues energizing the step motor 4 in step 109, and temporarily terminates subsequent processing. This energization is performed to hold the valve element 3 of the PCV valve 1 in the fixed position. Accordingly, while this energization is continued, the step motor 4 generates heat.

If the determination in step 105 is negative, on the other hand, in step 106 the ECU 23 reads the cooling water temperature THW detected by the water temperature sensor 26. In step 107, the ECU 23 determines whether or not it is less than 10 min. from the time when the cooling water temperature THW reaches "80° C.". Herein, even when the temperature of the valve chamber 10 of the PCV valve 1 becomes below zero and then the intake air temperature exceeds "0° C.", the temperature of the valve chamber 10 may remain below zero because of delay of heat conduction and accordingly water vapor in the blow-by gas may freeze. The determination in step 107 is executed by assuming such condition. If this determination result is affirmative, judging that the PCV valve 1 may freeze up, the ECU 23 energizes the step motor 4 of the PCV valve 1 and continues energizing the step motor 104 in step 109, and temporarily terminates subsequent processing. This energization is performed to hold the valve element 3 of the PCV valve 1 in the fixed position.

If the determination result in step 107 is negative, on the other hand, judging that engine warm-up is finished and the PCV valve 1 is less likely to freeze up, the ECU 23 stops energizing the step motor 4 in step 108 and temporarily terminates subsequent processing.

In this embodiment, as mentioned above, in the case where the intake air temperature THA corresponding to the outside air temperature is a predetermined value or less ("0° C. or less" in this embodiment), the ECU 23 energizes the step motor 4 in order to hold the valve element 3 in the fixed position. In this embodiment, also in the case where the intake air temperature THA is another predetermined value or less ("5° C. or less" in this embodiment) and it is within 20 min. from the engine start, the ECU 23 energizes the step motor 4 in order to hold the valve element 3 in the fixed position. In this embodiment, furthermore, also in the case where the intake air temperature THA is the predetermined value or less ("5° C. or less" in this embodiment) and it is less than "10 min. or less" from the time when the cooling water temperature THW reaches "80° C.", the ECU 23 energizes the step motor 4 in order to hold the valve element 3 in the fixed position.

According to the heating apparatus of the electromagnetic PCV valve in the present embodiment explained above, when the valve element 3 of the PCV valve 1 does not have to be moved, the ECU 23 energizes the step motor 4 to hold the valve element 3 in the fixed state, thus causing the coils 4d of the step motor 4 to generate heat. It is known that this heat reaches a maximum of "70° C. to 80° C.". Herein, the valve element 3 in the valve chamber 10 is enclosed by the cover member 13 that has higher heat conductivity than the first housing 6, and the flange 13b of the cover member 13 is thermally connected to the end face of the motor case 11. Accordingly, the heat generated in the step motor 4 will be conducted to the cover member 13 earlier than to the first housing 6 and the second housing 7. The valve element 3 can thus be heated promptly by the heat radiated from the cover member 13. The step motor 4 and the valve element 3 are thermally connected to each other through the output shaft 4a that has higher heat conductivity than the first housing 6. Accordingly, the heat generated in the step motor 4 will be conducted to the valve element 3 through the output shaft 4c earlier than to the first housing 6, and the valve element 3 will be heated promptly. Consequently, at the engine start in a cold condition, it is possible to promptly eliminate freezing between the valve seat 2 and the valve element 3 by utilizing the heat generated in the step motor 4 without adding a special heating means such as an electric heater. During the engine operation following the engine start, on the other hand, even when the valve element 3 does not have to be moved, energization of the step motor 4 can be performed to hold the valve element 3 in the fixed position. This energization can make the step motor 4 generate heat. By utilizing the generated heat, it is possible to efficiently prevent freezing between the valve seat 2 and the valve element 3 without adding a special heating means such as an electric heater. Consequently, even while the valve element 3 is stopped, the valve element 3 can be prevented from freezing and sticking to the valve seat 2.

On the other hand, when the ECU 23 energizes the step motor 4 to move the valve element 3 of the PCV valve 1, the valve element 3 is moved with respect to the valve seat 2 by the step motor 4, thereby changing the size of the blow-by gas passage between the valve seat 2 and the valve element 3. At that time, the heat generated in the coils 4*d* of the step motor 4 will also be conducted promptly from the step motor 4 to the cover member 13 and the output shaft 4*c*. Accordingly, the valve element 3 is heated promptly by the heat conducted through the cover member 13 and the output shaft 4*c*. Even when the valve element 3 has to be moved, therefore, the freezing between the valve seat 2 and the valve element 3 can be prevented or can be eliminated by utilizing the heat generated in the step motor 4 without adding a special heating means such as an electric heater.

In this embodiment, when the valve element 3 of the PCV valve 1 is to be held in the fixed position, the step motor 4 is energized and continues being energized if the PCV valve 1 is likely to freeze up and, alternatively, the step motor 4 is not energized if the PCV valve 1 is less likely to freeze up. Specifically, when the valve element 3 of the PCV valve 1 is to be held in the fixed position and maintained at the predetermined opening degree and also the intake air temperature THA corresponding to the outside temperature is a predetermined value ("5° C.") or less, energization to hold the valve element 3 in the fixed position is performed for the step motor 4. When the intake air temperature THA is not the predetermined value ("5° C.") or less, energization to hold the valve element 3 in the fixed position is not performed for the step motor 4. Accordingly, the step motor 4 is energized only if the PCV valve 1 is likely to freeze up, power consumption to prevent freezing between the valve seat 2 and the valve element 3 can be reduced.

In this embodiment, furthermore, after a warm-up period where freezing is eliminated, the cover member 13 also serves as a radiator of the step motor 14. This makes it possible to prompt heat radiation of the step motor 4, restrain torque decrease caused by a high temperature of the step motor 4, and achieve size reduction in the step motor 4 to obtain desired torque as compared with the case where the cover member 13 is not provided.

In this embodiment, additionally, the cover member 13 covers the valve element 3 excepting the leading end portion thereof. It is therefore possible to reduce an amount of deposits contained in the blow-by gas which may stick to the valve element 3.

Second Embodiment

A second embodiment embodying a heating apparatus of an electromagnetic PCV valve according to the present invention will be described referring to the accompanying drawing.

In each of the following embodiments, the same components or parts as those in the first embodiment will be given the same reference signs and the following explanation is focused on a different configuration.

Figure 3:
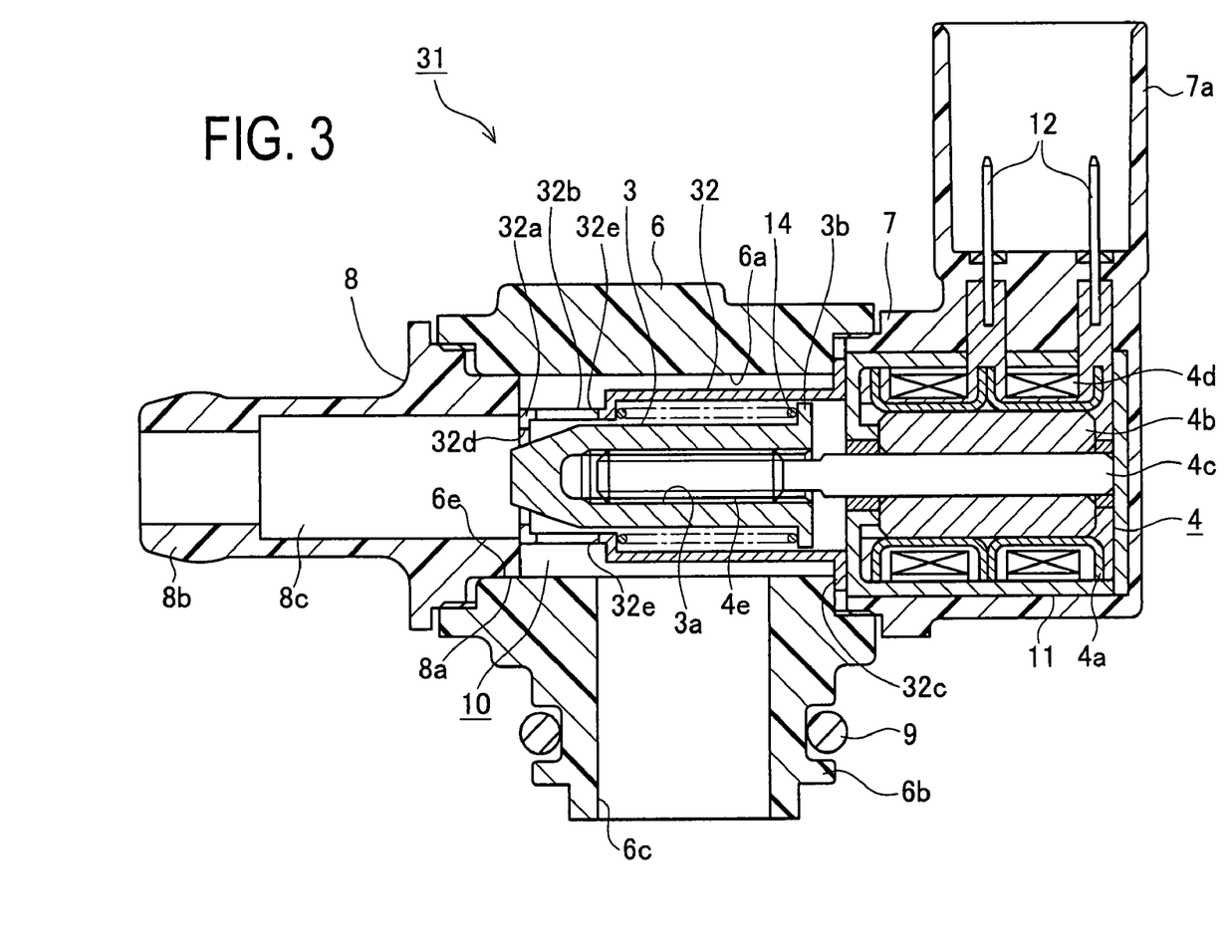
FIG. 3 is a sectional view of an electromagnetic PCV valve in a second embodiment.

FIG. 3 is a sectional view of an electromagnetic PCV valve 31 in this embodiment. This embodiment differs from the PCV valve 1 in the first embodiment in the configuration of the PCV valve 31. Differently from the first embodiment, the PCV valve 31 in the third embodiment does not include the valve seat 2 and, instead, includes a cover member 32 integrally formed with a valve seat 32*a*, which is placed in the valve chamber 10 so as to enclose the valve element 3.

The cover member 32 has a nearly cylindrical shape including a small-diameter part 32*b* on a leading side and a flange 32*c* on a rear end side. This cover member 32 is also made of metal, such as alumina, having higher thermally conductivity than the first housing 6. The small-diameter part 32*b* has a leading end wall serving as the valve seat 32*a* formed with a valve hole 32*d* in the center thereof. A plurality of holes 32*e* is formed at equal intervals in the peripheral wall of the small-diameter part 32*b*. This cover member 32 is placed in the valve chamber 10 so as to cover the valve element 3. In this embodiment, the compression spring 14 is mounted between the flange 3*b* of the valve element 3 and a shoulder portion of the small-diameter part 32*b* of the cover member 32. The leading end portion of the valve element 3 has a truncated conical shape that is able to pass through the valve hole 32*d* of the valve seat 32*a*. Other configurations of the PCV valve 31 and related to energization control of the PCV valve 31 are the same or similar to those in the first embodiment.

In the third embodiment, the step motor 4 is actuated by energization to move the valve element 3 with respect to the valve seat 32*a*, thereby changing the size of the blow-by gas passage between the valve seat 32*a* and the valve element 3, namely, changing the "opening degree", to regulate an amount of blow-by gas to be metered by the PCV valve 31. The blow-by gas flowing in the inlet passage 6*c* of the first housing 6 will enter the valve chamber 10, pass through the holes 32*e* of the small-diameter part 32*b* of the cover member 32, and then flow in the hollow part 8*c* of the third housing 8. In this embodiment, the valve seat 32*a* and the cover member 32 are integrally formed, so that any additional valve seat is not needed, achieving a reduction in the number of parts or components of the PCV valve 31.

Even in this embodiment, the step motor 4 is energized in order to hold the valve element 3 of the PCV valve 31 in the fixed position or the step motor 4 is energized in order to move the valve element 3. Thus, the step motor 4 generates heat. Herein, the valve element 3 in the valve chamber 10 is enclosed by the cover member 32 having higher heat conductivity than the first housing 6. The flange 32*c* of the cover member 32 is thermally connected to the end face of the motor case 11 of the step motor 4. The heat generated in the step motor 4 will be conducted to the cover member 32 earlier than to the first housing 6 and the second housing 7. Accordingly, the valve element 3 can be heated promptly by the heat radiated from the cover member 32. Since the valve seat 32*a* is integrally formed with the cover member 32, the valve seat 32*a* can be heated promptly when the cover member 32 is heated. By utilizing the heat generated in the step motor 4, without adding a special heating means such as an electric heater, it is possible to promptly eliminate freezing between the valve seat 32*a* and the valve element 3 or to prevent freezing between the valve seat 32*a* and valve element 3. In particular, even when the valve element 3 does not have to be moved, energization for the step motor 4 can be performed to hold the valve element 3 in the fixed position. This energization causes the step motor 4 to generate heat, thereby heating the valve element 3. The freezing between the valve seat 32*a* and the valve element 3 can thus be prevented. This makes it possible to prevent the valve element 3 from freezing and sticking to the valve seat 32*a* even when the valve element 3 is stopped. Other operations and advantages are the same as those in the first embodiment.

Third Embodiment

A third embodiment of a heating apparatus of an electromagnetic PCV valve according to the present invention will be explained referring to the accompanying drawing.

Figure 4:
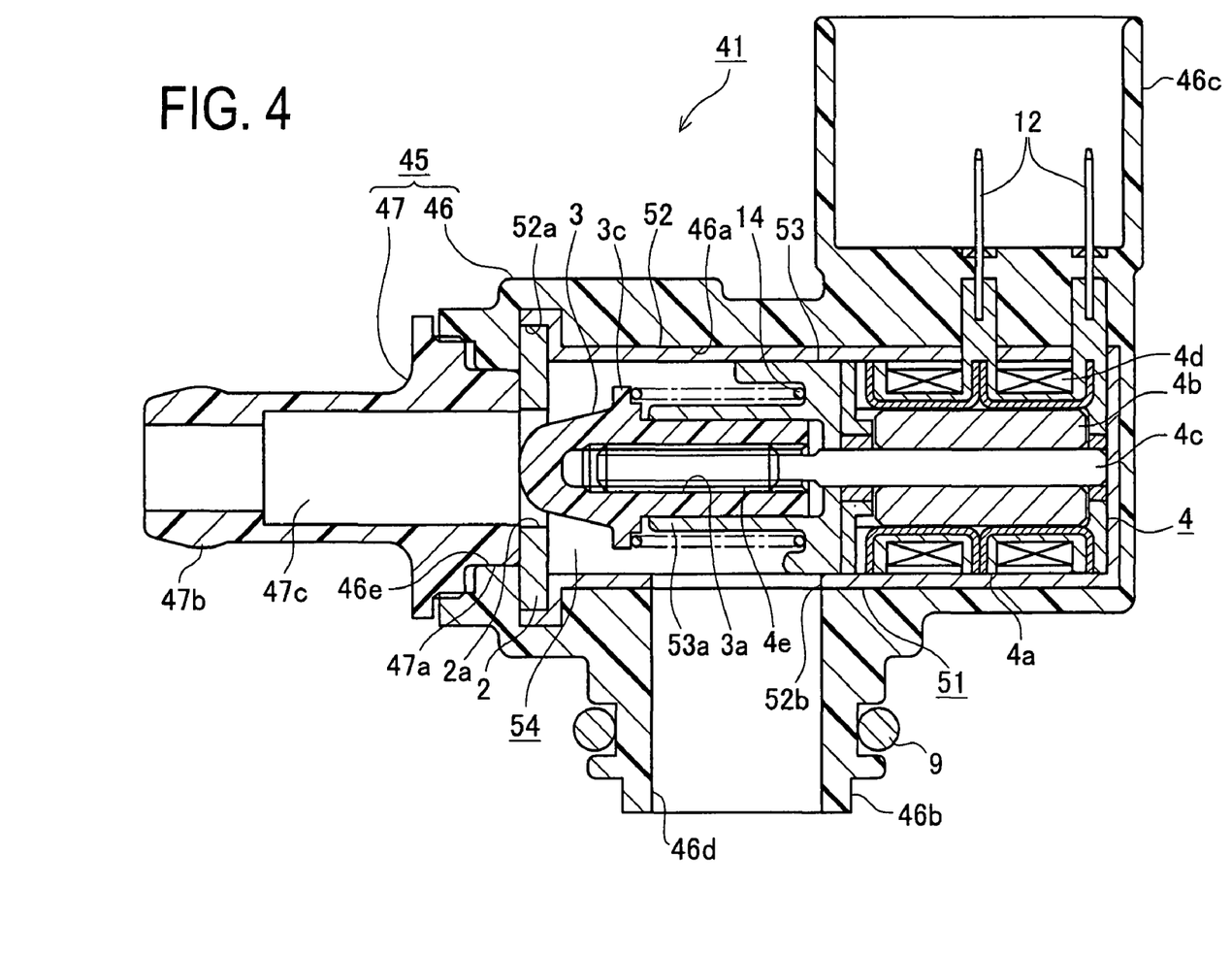
FIG. 4 is a sectional view of an electromagnetic PCV valve in a third embodiment.

FIG. 4 is a sectional view of an electromagnetic PCV valve 41 in this embodiment. This embodiment differs from the PCV valve 1 in the first embodiment in the configuration that a housing 45 is constituted of two separate parts, the cover member 13 is not provided, and a valve assembly 51 is provided in the housing 45.

Specifically, in this embodiment, the housing 45 having a hollow shape is constituted of a main housing 46 and a sub-housing 47 assembled together. The main housing 46 includes a hollow part 46a formed therein, an inlet-side pipe joint 46b formed on a lower side, and a connector 46c formed on an upper side. The inlet-side pipe joint 46b includes an inlet passage 46d communicated with the hollow part 46a. A seal ring 9 is fitted on the outer periphery of the inlet-side pipe joint 46b. The sub-housing 47 is assembled with the main housing 46 by press-fitting and ultrasonic-welding a rear-end periphery 47a in a mounting hole 46e formed in a leading end of the main housing 46. A leading end portion of the sub-housing 47 is formed as an outlet-side pipe joint 47b.

In the hollow part 46a of the main housing 46, the valve assembly 51 is integrally provided. This valve assembly 51 comprises a closed-bottom cylindrical case 52, the step motor 4 housed in the bottom (the right side in FIG. 4) of the case 52, a partition wall member 53 covering one end face of the step motor 4, the valve element 3 placed to be movable with respect to the partition wall member 53 and drivingly connected to the output shaft 4c of the step motor 4, and the valve seat 2 fitted in an opening 52a of the case 52 in correspondence with the valve element 3. The space between the valve seat 2 and the partition wall member 53 is a valve chamber 54 that houses the valve element 3.

As described above, in this valve assembly 51, the step motor 4, the partition wall member 53, the valve element 3, and the valve seat 2 are enclosed by the case 52. In addition, the step motor 4 and the valve seat 2 are placed in contact with the case 52. In this embodiment, the case 52 is made of a member having higher heat conductivity than the main housing 46. In this embodiment, specifically, the main housing 46 is made of resin and the case 52 is made of metal such as aluminum. Accordingly, the case 52 having higher heat conductivity than the main housing 46 serves as the wall surface of the valve chamber 54. In addition to above, the valve element 3 is made of resin and the valve seat 2 is made of metal such as aluminum.

The external terminals 12 provided in the stator 4a are arranged with respective distal ends protruding into the connector 46c. The outer periphery of the stator 4a is in contact with the inner wall of the case 52. The valve element 3 has a nearly cylindrical shape having a rounded leading end portion protruding toward the valve seat 2. The partition wall member 53 has a sleeve 53a in the center. In the sleeve 53a, the output shaft 4c of the step motor 4 is and engaged with the valve element 3. Inside this sleeve 53a, the screw 4e formed on the outer periphery of the output shaft 4c is threadedly engaged in the screw hole 3a formed in the valve element 3, thereby drivingly connecting the valve element 3 and the output shaft 4c. A flange 3c is formed on an outer periphery of the leading end portion of the valve element 3. The compression spring 14 is mounted between the flange 3c and the partition wall member 53. The valve element 3 is therefore urged toward the valve seat 2 by the spring 14. The sub-housing 47 includes a hollow part 47c communicated with the valve chamber 54 of the main housing 46. The valve chamber 54 and the hollow part 47c form in combination a blow-by gas passage. The case 52 is formed with a hole 52b communicated with the inlet passage 46d.

In this embodiment, the valve assembly 51 is insert-molded in the main housing 46. Specifically, when the main housing 46 is to be molded of resin, the valve assembly 51 is set as an insert in a molding die and then molten resin is injected into the molding die to cover the valve assembly 51 by the molten resin. The molten resin is then solidified. Thus, the main housing 46 is produced as an integral composite component.

The connector 46c of the main housing 46 is connected to an external connector (not shown). The external connector is electrically connected to the external terminals 12. The external connector is also connected to an ECU (not shown) through an external wiring (not shown) to control the step motor 4. The configuration of energization control to the step motor 4 in this embodiment is the same as that in the first embodiment.

In this embodiment, similarly, when the step motor 4 is energized to hold the valve element 3 of the PCV valve 41 in the fixed position or the step motor 4 is energized to move the valve element 3, the step motor 4 generates heat. Herein, the case 52 constituting the valve assembly 51 is a member having higher heat conductivity than the main housing 46. Such case 52 encloses the step motor 4, the partition wall member 53, the valve element 3, and the valve seat 2. Furthermore, the step motor 4 and the valve seat 2 are placed in contact with the inner wall of the case 52. The heat generated in the step motor 4 will therefore be conducted to the valve seat 2 through the case 52 earlier than to the main housing 46, thereby promptly heating the valve seat 2. Accordingly, by utilizing the heat generated in the step motor 4, it is possible to promptly eliminate freezing between the valve seat 2 and the valve element 3 or prevent freezing between the valve seat 2 and the valve element 3 without adding a special heating means such as an electric heater. In particular, even when the valve element 3 does not have to be moved, the step motor 4 can be energized to hold the valve element 3 in the fixed position. This energization causes the step motor 4 to generate heat, thereby heating the valve seat 2, so that it is possible to efficiently prevent freezing between the valve seat 2 and the valve element 3. Consequently, even when the valve element 3 is stopped, the valve element 3 can be prevented from freezing and sticking to the valve seat 2. Other operations and advantages in this embodiment are the same those in the first embodiment.

Fourth Embodiment

A fourth embodiment of a heating apparatus of an electromagnetic PCV valve according to the present invention will be described referring to the accompanying drawing.

Figure 5:
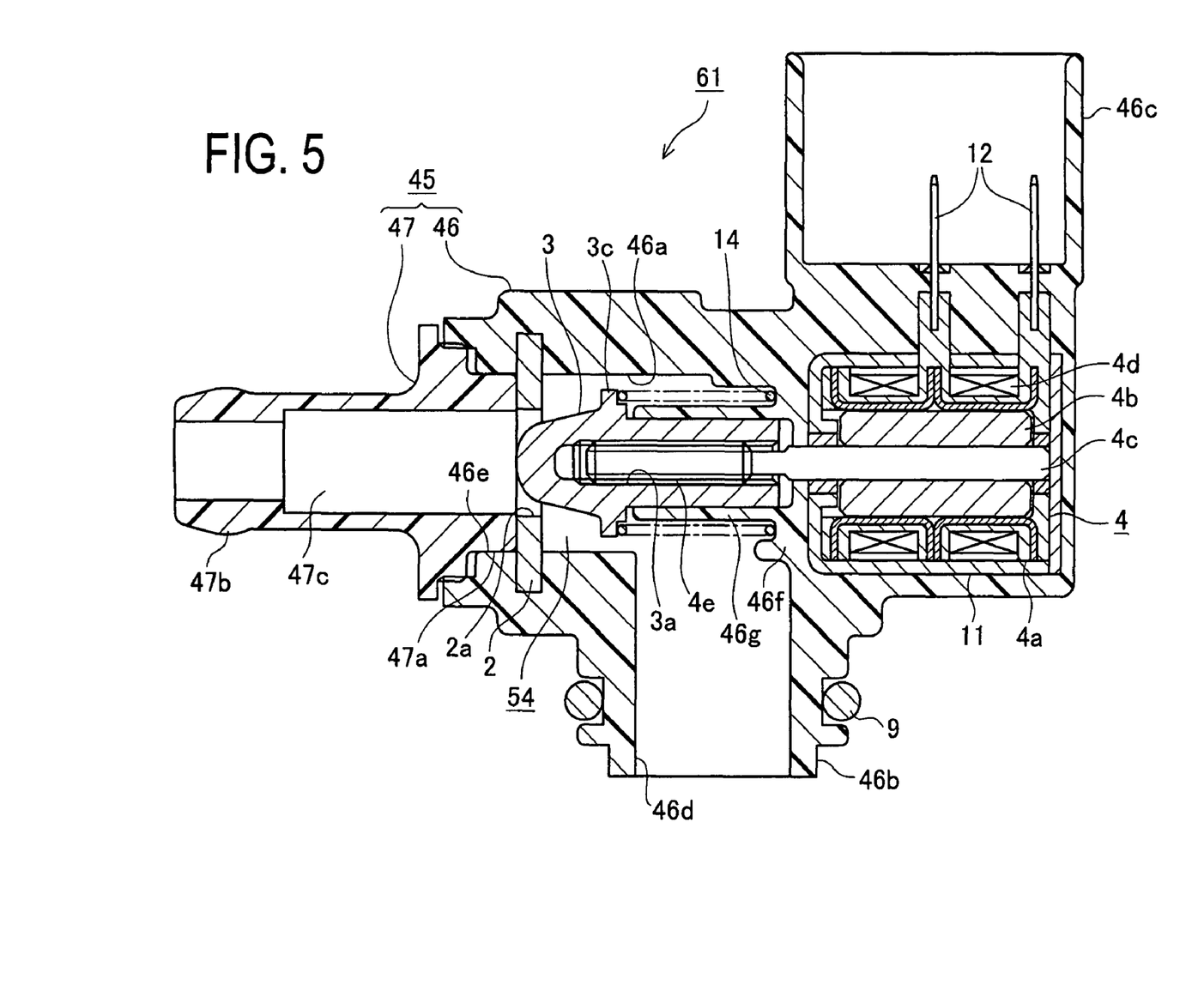
FIG. 5 is a sectional view of an electromagnetic PCV valve in a fourth embodiment.

FIG. 5 is a sectional view of an electromagnetic PCV valve 61 in this embodiment. The PCV valve 61 in this embodiment differs from the PCV valve 41 in the third embodiment in that the above valve assembly 51 is not provided. In the fourth embodiment, specifically, the case 52 in the third embodiment is omitted and the step motor 4 is enclosed alone in the motor case 11 and integrally molded in the main housing 46. In this embodiment, instead of the partition wall member 53 in the third embodiment, a partition wall portion 46f is integrally formed with the main housing 46. The valve element 3 is mounted in a sleeve 46g formed in the partition wall portion 46f. The valve seat 2 is integrally molded in the main housing 46. This embodiment differs from the third embodiment in that the valve element 3 connected to the output shaft 4c made of metal such as aluminum of the step motor 4 is made of metal such as aluminum. In this embodiment, accordingly, the step motor 4 and the valve element 3 are thermally connected to each other through the output shaft 4c having higher heat conductivity than the main housing 46. The valve element 3 is made of a member having higher heat conductivity than the main housing 46.

In this embodiment, consequently, when the step motor 4 is energized to hold the valve element 3 of the PCV valve 61 in the fixed position or when the step motor 4 is energized to move the valve element 3, the step motor 4 generates heat. Herein, the step motor 4 and the valve element 3 are thermally connected to each other through the output shaft 4c having higher heat conductivity than the main housing 46. Accordingly, the heat generated in the step motor 4 will be conducted to the valve element 3 through the output shaft 4c earlier than to the main housing 46, thereby heating the valve element 3 promptly. In this embodiment, therefore, by utilizing the heat generated in the step motor 4, it is possible to promptly eliminate freezing between the valve seat 2 and the valve element 3 or prevent freezing between the valve seat 2 and the valve element 3 without adding a special heating means such as an electric heater. In particular, even when the valve element 3 does not have to be moved, energization for the step motor 4 can be performed to hold the valve element 3 in the fixed position. This energization can cause the step motor 4 to generate heat, thereby heating the valve seat 2. It is therefore possible to efficiently prevent freezing between the valve seat 2 and the valve element 3. Consequently, even when the valve element 3 is stopped, the valve element 3 can be prevented from freezing and sticking to the valve seat 2. Other operations and advantages in this embodiment are the same as those in the first embodiment.

The present invention is not limited to the above embodiment(s) and may be embodied in other specific forms without departing from the essential characteristics thereof.

In each of the aforementioned embodiments, the housing 5 is constituted of two or three separate parts. An alternative is to form a housing in an integral one piece.

In each of the aforementioned embodiments, the electromagnetic device is the step motor 4. Alternatively, the electromagnetic device may be an electromagnetic actuator such as a linear solenoid.

While the presently preferred embodiment of the present invention has been shown and described, it is to be understood that this disclosure is for the purpose of illustration and that various changes and modifications may be made without departing from the scope of the invention as set forth in the appended claims.

The invention claimed is:

1. A heating apparatus of electromagnetic PCV valve, comprising:
a valve seat;
a valve element placed to be movable with respect to the valve seat;
an electromagnetic device for moving the valve element;
a housing that houses the valve seat, the valve element, and the electromagnetic device,
wherein the electromagnetic device is operated by energization to move the valve element with respect to the valve seat, thereby changing a size of a blow-by gas passage defined between the valve seat and the valve element;
wherein the heating apparatus of electromagnetic PCV valve further comprises:
a heat conduction device for conducting heat generated in the electromagnetic device by energization to at least one of the valve element and the valve seat,
the electromagnetic device being configured to selectively receive energization for moving the valve element and energization for holding the valve element in a fixed position; and
an energization control device for energizing the electromagnetic device to hold the valve element in the fixed position.

2. The heating apparatus of electromagnetic PCV valve according to claim 1, further comprising a temperature detection device for detecting temperature of outside air,
the energization control device energizes the electromagnetic device to hold the valve element in the fixed position when the detected outside air temperature is a predetermined value or less.

3. The heating apparatus of electromagnetic PCV valve according to claim 1, wherein the electromagnetic device is a step motor.

4. The heating apparatus of electromagnetic PCV valve according to claim 2, wherein the electromagnetic device is a step motor.

5. The heating apparatus of electromagnetic PCV valve according to claim 1, wherein the heat conduction device is a member having higher heat conductivity than the housing, and the member having higher heat conductivity than the housing is provided in the housing to enclose at least the electromagnetic device and the valve element.

6. The heating apparatus of electromagnetic PCV valve according to claim 2, wherein the heat conduction device is a member having higher heat conductivity than the housing, and the member having higher heat conductivity than the housing is provided in the housing to enclose at least the electromagnetic device and the valve element.

7. The heating apparatus of electromagnetic PCV valve according to claim 3, wherein the heat conduction device is a member having higher heat conductivity than the housing, and the member having higher heat conductivity than the housing is provided in the housing to enclose at least the electromagnetic device and the valve element.

8. The heating apparatus of electromagnetic PCV valve according to claim 4, wherein the heat conduction device is a member having higher heat conductivity than the housing, and the member having higher heat conductivity than the housing is provided in the housing to enclose at least the electromagnetic device and the valve element.

9. The heating apparatus of electromagnetic PCV valve according to claim 1, wherein the heat conduction device is a member having higher heat conductivity than the housing, and the electromagnetic device is thermally connected to the valve seat or the valve element through the member having higher heat conductivity than the housing.

10. The heating apparatus of electromagnetic PCV valve according to claim 2, wherein the heat conduction device is a member having higher heat conductivity than the housing, and the electromagnetic device is thermally connected to the valve seat or the valve element through the member having higher heat conductivity than the housing.

11. The heating apparatus of electromagnetic PCV valve according to claim 3, wherein the heat conduction device is a member having higher heat conductivity than the housing, and the electromagnetic device is thermally connected to the valve seat or the valve element through the member having higher heat conductivity than the housing.

12. The heating apparatus of electromagnetic PCV valve according to claim 4, wherein the heat conduction device is a member having higher heat conductivity than the housing, and the electromagnetic device is thermally connected to the valve seat or the valve element through the member having higher heat conductivity than the housing.

13. The heating apparatus of electromagnetic PCV valve according to claim 1, wherein the housing is formed with a valve chamber in which the valve element is placed, the heat conduction device is a cover member having higher heat conductivity than the housing, the cover member is placed in the valve chamber to enclose the valve element, and the cover member has an end thermally connected to the electromagnetic device.

14. The heating apparatus of electromagnetic PCV valve according to claim 2, wherein the housing is formed with a valve chamber in which the valve element is placed, the heat conduction device is a cover member having higher heat conductivity than the housing, the cover member is placed in the valve chamber to enclose the valve element, and the cover member has an end thermally connected to the electromagnetic device.

15. The heating apparatus of electromagnetic PCV valve according to claim 3, wherein the housing is formed with a valve chamber in which the valve element is placed, the heat conduction device is a cover member having higher heat conductivity than the housing, the cover member is placed in the valve chamber to enclose the valve element, and the cover member has an end thermally connected to the electromagnetic device.

16. The heating apparatus of electromagnetic PCV valve according to claim 4, wherein the housing is formed with a valve chamber in which the valve element is placed, the heat conduction device is a cover member having higher heat conductivity than the housing, the cover member is placed in the valve chamber to enclose the valve element, and the cover member has an end thermally connected to the electromagnetic device.

17. The heating apparatus of electromagnetic PCV valve according to claim 13, wherein the valve seat is integrally formed with the cover member.

18. The heating apparatus of electromagnetic PCV valve according to claim 14, wherein the valve seat is integrally formed with the cover member.

19. The heating apparatus of electromagnetic PCV valve according to claim 15, wherein the valve seat is integrally formed with the cover member.

20. The heating apparatus of electromagnetic PCV valve according to claim 16, wherein the valve seat is integrally formed with the cover member.

* * * * *